(12) United States Patent
Sun et al.

(10) Patent No.: US 10,140,501 B2
(45) Date of Patent: Nov. 27, 2018

(54) HIGH RESOLUTION THIN DEVICE FOR FINGERPRINT RECOGNITION

(71) Applicant: CentraLED Technology Ltd., Taoyuan (TW)

(72) Inventors: Ching-Cherng Sun, Taoyuan (TW); Yeh-Wei Yu, Taoyuan (TW); Jhih-You Cai, Taoyuan (TW); Yu-Yu Chang, Taoyuan (TW)

(73) Assignee: CentraLED Technology, Ltd., Taoyuan (TW)

( * ) Notice: Subject to any disclaimer, the term of this patent is extended or adjusted under 35 U.S.C. 154(b) by 5 days.

(21) Appl. No.: 15/373,784

(22) Filed: Dec. 9, 2016

(65) Prior Publication Data

US 2017/0206396 A1 Jul. 20, 2017

Related U.S. Application Data

(60) Provisional application No. 62/278,499, filed on Jan. 14, 2016.

(51) Int. Cl.
*G06K 9/00* (2006.01)

(52) U.S. Cl.
CPC .................. *G06K 9/0004* (2013.01)

(58) Field of Classification Search
CPC .................................................. G06K 9/0004
See application file for complete search history.

(56) References Cited

U.S. PATENT DOCUMENTS

| 5,726,443 | A | * | 3/1998 | Immega | G01S 17/026 250/208.1 |
|---|---|---|---|---|---|
| 6,867,850 | B2 | * | 3/2005 | McClurg | G06K 9/2036 356/71 |
| 6,998,600 | B2 | * | 2/2006 | Wang | G21K 7/00 250/216 |
| 7,136,514 | B1 | * | 11/2006 | Wong | G06K 9/00026 382/124 |
| 7,920,728 | B2 | * | 4/2011 | Chen | G06K 9/00046 382/115 |
| 9,829,614 | B2 | * | 11/2017 | Smith | G02B 27/58 |
| 2017/0236018 | A1 | * | 8/2017 | Higuchi | G06K 9/00885 382/115 |

* cited by examiner

*Primary Examiner* — John Strege
(74) *Attorney, Agent, or Firm* — Juan Carlos A. Marquez; Marquez IP Law Office, PLLC

(57) ABSTRACT

The present invention discloses a high resolution thin device for fingerprint recognition, it includes a transparent plate, an imaging component, an optical sensor and at least one light source; or a high resolution thin device for fingerprint recognition that includes plural transparent plates, plural imaging components, plural optical sensors and at least one light source. With the implementation of the present invention, the fingerprint recognition device provides the following advantageous effects: structural simplicity to improve ease of manufacture and low manufacturing costs; reduction of space occupation enabling further applications; suitable for applications that fills colloid between cover glass and optical sensor; and improving feature classification thus reduces recognition error.

16 Claims, 5 Drawing Sheets

HIGH RESOLUTION THIN DEVICE FOR FINGERPRINT RECOGNITION

BACKGROUND OF THE INVENTION

1. Technical Field

The present invention relates to a fingerprint recognition device, and more particularly to a high resolution thin device for fingerprint recognition.

2. Description of Related Art

To obtain the image of a fingerprint, traditional optical fingerprint recognition system or device usually adopts a built-in image system. And due to the bulk size of traditional optical fingerprint recognition system or device, a positive lens can be used to obtain the image.

However, as the increasingly widespread of the fingerprint recognition system or device to handheld or portable devices that is relatively small in size, the space reserved for fingerprint recognition system or device becomes quite small.

And that is why positive lens for traditional fingerprint recognition systems cannot be used in applications for handheld or portable device nowadays.

It is therefore highly desirable to have the development of a thin type, high imaging quality fingerprint recognition device to apply in limited space in thin or small size portable or mini devices.

BRIEF SUMMARY OF THE INVENTION

The present invention discloses a high resolution thin device for fingerprint recognition, it includes a transparent plate, an imaging component, an optical sensor and at least one light source; or a high resolution thin device for fingerprint recognition that includes plural transparent plates, plural imaging components, plural optical sensors and at least one light source. With the implementation of the present invention, the fingerprint recognition device provides the following advantageous effects: structural simplicity to improve ease of manufacture and low manufacturing costs; reduction of space occupation enabling further applications; suitable for applications that fills colloid between cover glass and optical sensor; and improving feature classification thus reduces recognition error.

The present invention provides a high resolution thin device for fingerprint recognition, used to sense or recognize a fingerprint, comprising: a transparent plate, being made of light transmitting substance, a fingerprint of a finger to be recognized being placed on the surface of the transparent plate; an imaging component, being fixedly provided beside a surface that is opposite to the surface where the finger being placed on of the transparent plate; an optical sensor, being fixedly provided beside the imaging component in a way that the imaging component being in between the transparent plate and the optical sensor; and at least one light source, being fixedly provided beside the transparent plate, wherein the light transmitted from the light source penetrates the transparent plate and illuminates the fingerprint.

The present invention provides another high resolution thin device for fingerprint recognition, used to sense or recognize a fingerprint, comprising: plural transparent plates, each being made of light transmitting substance, a fingerprint of a finger to be recognized being placed on the surface of at least two consequent transparent plates; plural imaging components, each being fixedly provided beside a surface that is opposite to the surface where the finger being placed on of a transparent plate; plural optical sensors, each being fixedly provided beside an imaging component in a way that the imaging component being in between the transparent plate and the optical sensor; and at least one light source, being fixedly provided beside the transparent plates, wherein the light transmitted from the light source penetrates the transparent plates and illuminates the fingerprint.

Implementation of the present invention at least provides the following advantageous effects:

1. Structure simplicity to improve ease of manufacturing and low manufacturing costs.
2. Reduction of space occupation enabling further applications.
3. High resolution to adequately classify or recognize fingerprint.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1A:
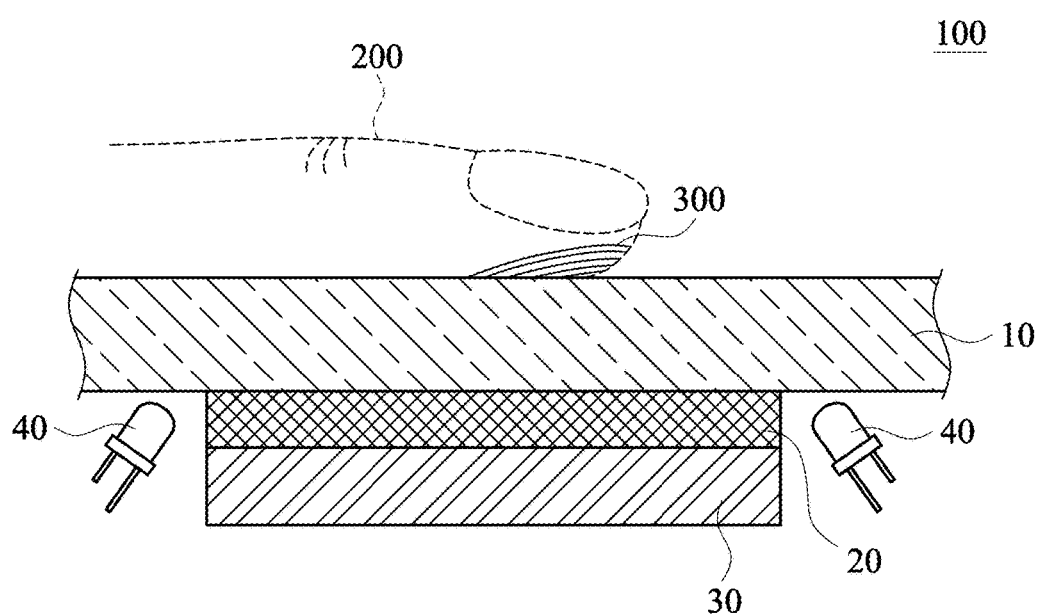
FIG. 1A is a structural perspective view of a high resolution thin device for fingerprint recognition in an embodiment of the present invention.

Please refer to FIG. 1A, a high resolution thin device for fingerprint recognition 100 in an embodiment of the present invention includes a transparent plate 10, an imaging component 20, an optical sensor 30 and at least one light source 40.

As shown in FIG. 1A, the transparent plate 10 can be made of glass or any transparent material that is transparent to visible light, light in infrared region or light in the ultraviolet region.

Thickness of the transparent plate 10 can be in the range from 1 micrometer to 800 micrometer. Besides, the finger 200 with the finger print 300 to be recognized or processed rests on one surface of the transparent plate 10.

As can be seen in FIG. 1A, the finger 200 placed on above the transparent plate 10 is illuminated and reflects the light emit by at least one light source 40 beside the optical sensor 30.

As can be seen in FIG. 1A, the imaging component 20 forms an image of the fingerprint 300 of the finger 200 on the optical sensor 30, the image is then processed or recognized by the optical sensor 30 or a device connected with the high resolution thin device for fingerprint recognition 100.

As shown in FIG. 1A, the optical sensor 30 is being fixedly provided beside the imaging component in a way that the imaging component being in between the transparent plate and the optical sensor.

As also shown in FIG. 1A, at least one light source 40 is being fixedly provided beside the transparent plates, wherein the light transmitted from the light source penetrates the transparent plates and illuminates the fingerprint.

The aforesaid light source 40 can be composed of at least one low cost, consuming less power and easy to use LED or laser diode (LD).

Figure 1B:
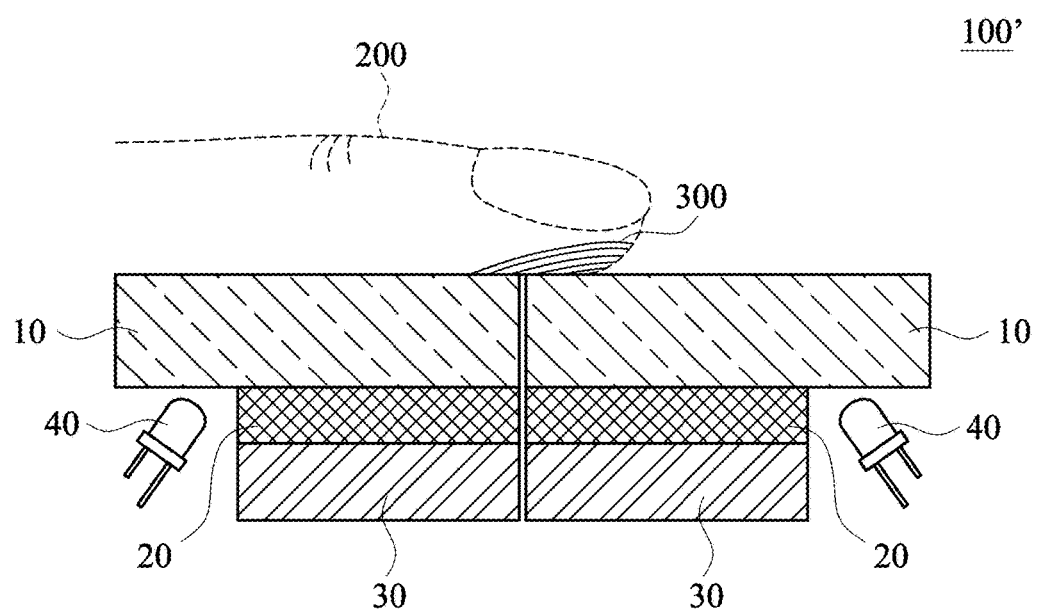
FIG. 1B is a structural perspective view of another high resolution thin device for fingerprint recognition in an embodiment of the present invention.

As further shown in FIG. 1B, is a high resolution thin device for fingerprint recognition 100' in another embodiment of the present invention, it includes plural combinations of imaging component 20 and optical sensor 30; and at least one light source 40, wherein each combination of an imaging component 20 and an optical sensor 30 is covered by a transparent plate 10 and become a transparent plate 10+imaging component 20+optical sensor 30 combination.

As shown in FIG. 1B, the recognition or processing of finger 300 by the high resolution thin device for fingerprint recognition 100' is performed by at least two neighboring combinations of transparent plate 10+imaging component 20+optical sensor 30 and at least one light source 40.

Except the number and combination feature, technical feature of the transparent plate 10, imaging component 20, pinhole 21 and the optical sensor 30 of the high resolution thin device for fingerprint recognition 100' is same as that of the high resolution thin device for fingerprint recognition 100.

As shown in FIG. 1A, FIG. 1B, FIG. 2A and FIG. 2B, each imaging component 20 is a pinhole imaging device connected to the transparent plate 10, which produces the image 300' of the finger print 300 and output the image 300' to the optical sensor 30 for processing or recognition.

Figure 2A:
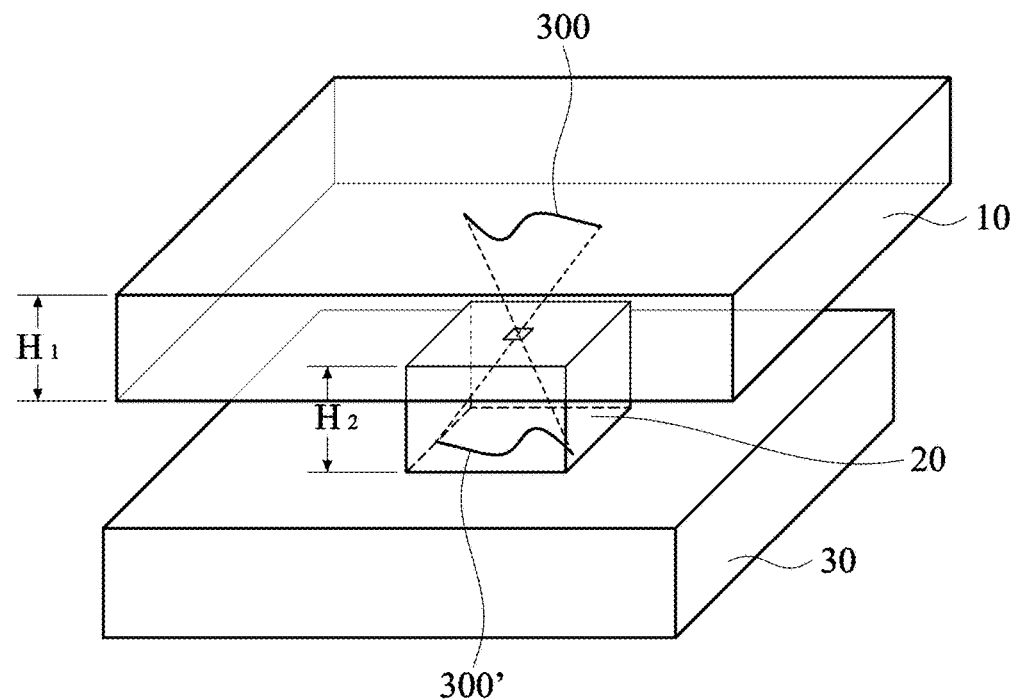
FIG. 2A is a perspective view of fingerprint recognition in an embodiment of the present invention.

As shown in FIG. 2A, the image 300' producing mathematical equation of the imaging component 20 is $$\frac{1}{L_i} - \frac{1}{L_o} = \frac{1}{f_e}$$

Wherein Li is the image length, Lo is the object length, and fe is the effective focal length. Wherein, as shown in FIG. 2A, Li is equal to the thickness H1 of the transparent plate 10, and Lo is equal to the thickness H2 of the imaging component 20.

Figure 2B:
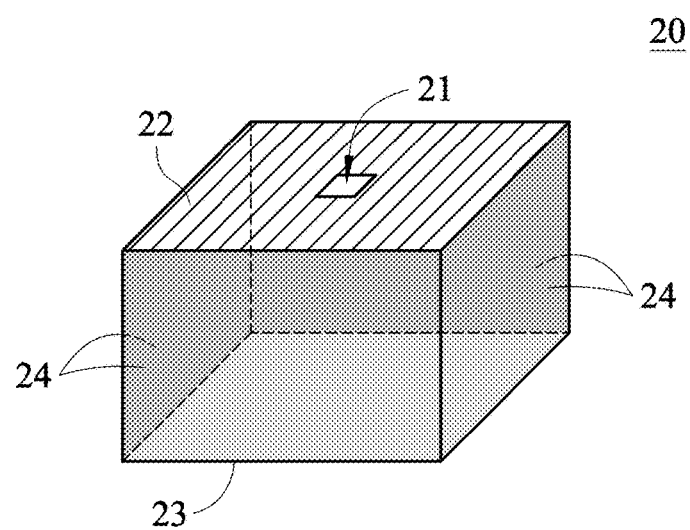
FIG. 2B is a perspective view of an imaging component in an embodiment of the present invention.

As shown in FIG. 2B, is an example of the imaging component 20 of the present invention. The surface 22 of the imaging component 20 that contacts with the transparent plate 10 is non-transparent and the light reflected to surface 22 from finger 200 is blocked, while the pinhole 21 on surface 22 is where the light penetrates through and image 300' is formed on the optical sensor 30 according to the shape or pattern of the finger print 300.

As for the other surfaces besides the surface 22 on the imaging component 20, the bottom surface 23 opposites to surface 22 is transparent to light, while the side walls 24 of the imaging component 20 are opaque to light, so that the light reflected from the finger print 300 can only passes through pinhole 21 and the imaging component 20, then forms the image 300' on the optical sensor 30 without suffering from interference.

Figure 3A:
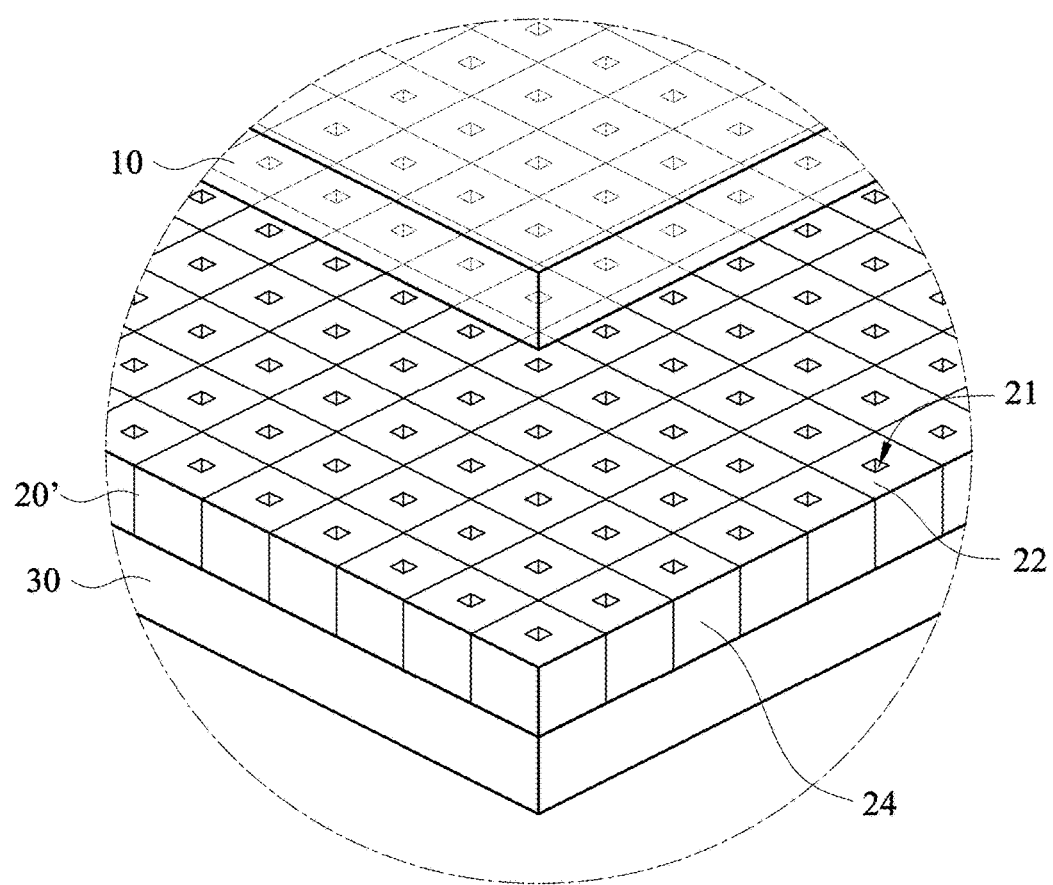
FIG. 3A is a three-dimensional perspective view of a high resolution thin device for fingerprint recognition that uses pinhole array in an embodiment of the present invention.
Figure 3B:
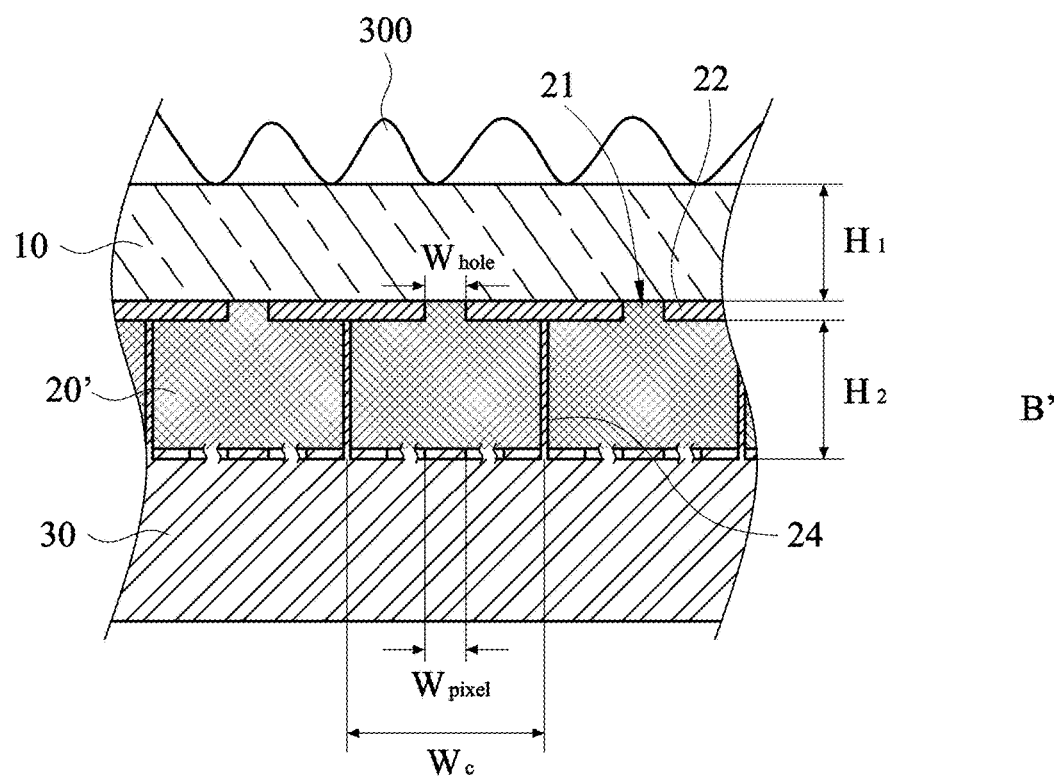
FIG. 3B is a perspective sectional view of a high resolution thin device for fingerprint recognition that uses pinhole array in an embodiment of the present invention.

As then shown in FIG. 3A and FIG. 3B, to obtain fingerprint image of a wider area, imaging component 20' assembled by pinholes can be used to produce the image of finger print 300, wherein the imaging component 20' can be assembled by a pinhole array.

That is, as can be seen in FIG. 3A and FIG. 3B, the imaging component 20' is composed of plural box type structures with a pinhole on each, with every side walls 24 of each box type structure being opaque that the images generated by every box type structure can be close to each other without been overlapped to produce interference, maximum use percentage of pixels of the optical sensor 30 can be obtained.

The pinholes 21 of the foresaid imaging component 20' assembled by pinhole 21 array are located on above the optical sensor 30, thus every segments of the fingerprint 300 can be in imaging process individually at the same time, and then the images are combined to form the fingerprint image 300' of a wider area.

As shown in FIG. 3B, the ratio of the height H1 of the transparent plate 10 and the distance H2 from pinhole 21 to optical sensor 30 can be chosen as $$0.3 \leq H_2/H_1 \leq 1.3$$

Wherein the image is a shrink image when H2/H1<1, a 1:1 image when H2/H1=1, and an amplified image when H2/H1>1.

That is to say, while H2/H1=1 in high resolution thin device for fingerprint recognition 100 or high resolution thin device for fingerprint recognition 100', the generated image is a 1:1 image and the fingerprint image 300' of the finger 300 can be effectively acquired.

While H2/H1<1, each part of the generated fingerprint image 300' of the finger 300 is slightly overlapped. The merit of the overlapped images is in that a full image can be obtained after processed to erase the overlapping parts, while the shortcoming is in that the resolution will be reduced when the pixel number Wpixel of the optical sensor 30 is fixed.

Further while H2/H1>1, amplified images will be obtained that makes loss of part of the fingerprint image 300' comes with the merit of obtaining higher resolution when the pixel number (Wpixel) of the optical sensor 30 is fixed.

In the embodiments described above, the image quality of imaging component 20' assembled by pinhole 21 array is determined by the point spread function (PSF) as in the equation below $$\text{Image} = \text{Object} \otimes PSF$$

Wherein the effective width Wpsf of the point spread function PSF is related to the opening (denoted as Whole) of the Pinhole 21, the effective width Wpsf is almost equivalent to the opening Whole when the opening Whole is big and diffraction effect can be neglected. Besides, the size of the opening Whole can be reduced according to applications to improve or adjust the effective width Wpsf.

On the other hand, when the size of the opening Whole is almost equivalent to the wavelength of the light emit by the light source 40, diffraction becomes severe and the image spread width Wdiff due to diffraction starts to dominate the effective width Wpsf. At this moment, the width of the point spread function is a function of the following equation:

$$W_{PSF} \approx \max[W_{hole}, W_{diff}(W_{hole})]$$

Moreover, size of pinhole 21 also has influence to the imaging illumination (Eimage) of the optical sensor 30, and can be represented by the following equation:

$$E_{image} \propto W^2_{hole}$$

When considering the efficiency of energy and the imaging quality, the size of the opening (Whole) and the pixel number (Wpixel) of the optical sensor 30 can be chosen as the equation below:

$$0.3 W_{pixel} \leq W_{hole} \leq 3 W_{pixel}$$

Further, there will be illumination or irradiance differences between the pixels in the center and pixels in the periphery of the optical sensor 30 in the imaging of the imaging component 20' formed by plural pinholes 21, and results in recognition defects.

To avoid the above mentioned irradiance differences between the pixels exceed the sensing dynamic range of the optical sensor 30, width (Wc) and height H2 (equals to the thickness of the imaging component 20') of each of the pinholes 21 can be chosen to have the relating function as the following equation:

$$Wc < 4H2 \text{ or } Wc = 4H2$$

In addition, as shown in FIG. 1B, FIG. 3A and FIG. 3B, just one transparent plate 10 can be put on above the imaging component 20' formed by plural pinholes 21, or one transparent plate 10 can be put on above each pinhole 21 in other embodiments of the present invention.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A high resolution thin device for fingerprint recognition, used to sense or recognize a fingerprint, comprising:
    a transparent plate, being made of light transmitting substance, a fingerprint of a finger to be recognized being placed on the surface of the transparent plate;
    an imaging component, being fixedly provided beside a surface that is opposite to the surface where the finger being placed on of the transparent plate;
    an optical sensor, being fixedly provided beside the imaging component in a way that the imaging component being in between the transparent plate and the optical sensor;
    at least one light source, being fixedly provided beside the transparent plate, wherein the light transmitted from the light source penetrates the transparent plate and illuminates the fingerprint; and
    wherein the imaging component is composed of a box type structure with a pinhole, with each side wall of the box type structure being opaque;
    wherein a size of an opening (Whole) of the pinhole and a pixel number (Wpixel) of the optical sensor is selected based on the equation below:

$$0.3 W_{pixel} \leq W_{hole} \leq 3 W_{pixel};$$

and
    wherein the pinhole is selected to have a relating function based on the following equation:

$$Wc < 4H2 \text{ or } Wc = 4H2.$$

2. A high resolution thin device for fingerprint recognition, used to sense or recognize a fingerprint, comprising:
    plural transparent plates, each being made of light transmitting substance, a fingerprint of a finger to be recognized being placed on the surface of at least two consequent transparent plates;
    plural imaging components, each being fixedly provided beside a surface that is opposite to the surface where the finger being placed on of a transparent plate;
    plural optical sensors, each being fixedly provided beside an imaging component in a way that the imaging component being in between the transparent plate and the optical sensor; and
    at least one light source, being fixedly provided beside the transparent plates, wherein the light transmitted from the light source penetrates the transparent plates and illuminates the fingerprint;
    wherein the imaging components are each composed of a box type structure with a pinhole thereon, with each side wall of the box type structure being opaque;
    wherein the size of the opening (Whole) of the pinhole and the pixel number (Wpixel) of the optical sensor are selected based on the equation below:

$$0.3 W_{pixel} \leq W_{hole} \leq 3 W_{pixel};$$

and
    wherein the pinhole is selected to have a relating function based on the following equation:

$$Wc < 4H2 \text{ or } Wc = 4H2.$$

3. The high resolution thin device for fingerprint recognition of claim 1, wherein the transparent plate is made by glass.

4. The high resolution thin device for fingerprint recognition of claim 1, wherein the light source is composed of at least one LED or at least one laser diode (LD).

5. The high resolution thin device for fingerprint recognition of claim 1, wherein the diameter of the pinhole is less than or equal to 4 times the thickness of the imaging component.

6. The high resolution thin device for fingerprint recognition of claim 1, wherein the imaging component generates a fingerprint image received by an optical sensor for processing or recognition.

7. The high resolution thin device for fingerprint recognition of claim 1, wherein the transparent plate is being penetrated by visible light, infrared light or ultraviolet light.

8. The high resolution thin device for fingerprint recognition of claim 1, wherein the thickness of the transparent plate is in the range from 1 micrometer to 800 micrometer.

9. The high resolution thin device for fingerprint recognition of claim 1, wherein the thickness of the imaging component divided by the thickness of the transparent plate is in the range from 0.3 to 1.3.

10. The high resolution thin device for fingerprint recognition of claim 2, wherein any of the transparent plates is made by glass.

11. The high resolution thin device for fingerprint recognition of claim 2, wherein the light source is composed of at least one LED or at least one laser diode (LD).

12. The high resolution thin device for fingerprint recognition of claim 2, wherein the diameter of the pinhole is less than or equal to 4 times the thickness of the imaging component.

13. The high resolution thin device for fingerprint recognition of claim 2, wherein each of the imaging component generates a fingerprint image received by an optical sensor for processing or recognition.

14. The high resolution thin device for fingerprint recognition of claim 2, wherein any of the transparent plate is being penetrated by visible light, infrared light or ultraviolet light.

15. The high resolution thin device for fingerprint recognition of claim 2, wherein the thickness of any transparent plate is in the range from 1 micrometer to 800 micrometer.

16. The high resolution thin device for fingerprint recognition of claim 2, wherein the thickness of any imaging component divided by the thickness of the transparent plate beside is in the range from 0.3 to 1.3.

* * * * *